US010954918B2

(12) United States Patent
Arlabán Gabeiras et al.

(10) Patent No.: US 10,954,918 B2
(45) Date of Patent: Mar. 23, 2021

(54) METHOD FOR OPERATING ELECTRICAL MACHINES

(71) Applicant: NORDEX ENERGY SPAIN, S.A., Barasoain (ES)

(72) Inventors: Teresa Arlabán Gabeiras, Barasoain (ES); Jose Miguel García Sayés, Barasoain (ES); Ricardo Royo García, Barasoain (ES); Miguel Núñez Polo, Barasoain (ES)

(73) Assignee: NORDEX ENERGY SPAIN, S.A., Barasoain (ES)

( * ) Notice: Subject to any disclaimer, the term of this patent is extended or adjusted under 35 U.S.C. 154(b) by 0 days.

(21) Appl. No.: 16/421,884

(22) Filed: May 24, 2019

(65) Prior Publication Data

US 2019/0360463 A1 Nov. 28, 2019

(30) Foreign Application Priority Data

May 24, 2018 (EP) ..................... 18382357

(51) Int. Cl.
*F03D 7/04* (2006.01)
*F03D 7/02* (2006.01)
*H02P 9/00* (2006.01)
*H02P 9/10* (2006.01)
*H02P 101/15* (2016.01)
*F03D 9/25* (2016.01)

(52) U.S. Cl.
CPC ............. *F03D 7/04* (2013.01); *F03D 7/0272* (2013.01); *F03D 7/042* (2013.01); *H02P 9/006* (2013.01); *H02P 9/007* (2013.01); *H02P 9/102* (2013.01); *H02P 9/105* (2013.01); *F03D 9/257* (2017.02); *F05B 2270/335* (2013.01); *F05B 2270/337* (2013.01); *H02P 2101/15* (2015.01)

(58) Field of Classification Search
CPC .......... F03D 7/04; F03D 7/0272; F03D 7/042; F03D 9/257; H02P 9/006; H02P 9/007; H02P 9/102; H02P 9/105; H02P 2101/15; F05B 2270/335; F05B 2270/337
See application file for complete search history.

(56) References Cited

U.S. PATENT DOCUMENTS 7,629,705 B2 * 12/2009 Barker ................ H02J 3/386
290/55
2012/0061964 A1 * 3/2012 Kirchner ............ H02J 3/386
290/44
2014/0339830 A1 11/2014 Gupta et al.

FOREIGN PATENT DOCUMENTS

EP 2236820 A2 10/2010

* cited by examiner

*Primary Examiner* — Tulsida C Patel
*Assistant Examiner* — Joseph Ortega
(74) *Attorney, Agent, or Firm* — Hayes Soloway P.C.

(57) ABSTRACT

A solution to optimally manage those requirements ensuring on the one hand, that the requirements set by the grid operators are appropriately and accurately accomplished at a point of interconnection (POI) and on the other hand, preventing the wind turbines from over fulfilling the requirements, for example, by remaining connected at voltages levels higher or lower than the ones required which, although possible, may cause higher loads and currents in the wind turbines than needed to fulfill the requirements.

16 Claims, 6 Drawing Sheets

METHOD FOR OPERATING ELECTRICAL MACHINES

CROSS-REFERENCE TO RELATED APPLICATIONS AND PRIORITY

This patent application claims priority from EP Patent Application No. 18382357.4 filed May 24, 2018, which is herein incorporated by reference in its entirety.

DESCRIPTION

Field of the Invention

This invention relates generally to electrical machines and more particularly, to methods and apparatus for operating electrical machines.

Background of the Invention

Generally, a wind turbine includes a turbine that has a rotor that includes a rotatable hub assembly having multiple blades. The blades transform mechanical wind energy into a mechanical rotational torque that drives a generator via a shaft. The rotor is generally rotationally coupled to the generator through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbine generators also exist. The rotor, generator, gearbox and other components are typically mounted within a housing, or nacelle, that is positioned on top of a base that may be a truss or tubular tower.

Some geared configurations include doubly fed induction generators (DFIGs). Such configurations may also include an induction generator and a power converter used to control currents according to active and reactive power references set for the wind turbine (WT) to comply with certain grid code requirements.

Under certain circumstances, a fault in a utility grid may occur that may cause low voltage dips with voltage fluctuations that approach zero volts. Other kind of events may also cause an overvoltage.

Generally, the utility grid operators require the wind turbines to accomplish certain requirements during those kinds of faults in order to be given the permits to be connected to the grid. These requirements include, among others, remaining connected to the grid during predetermined voltage vs. time curves specified at a point of interconnection to the grid. Voltage in those curves is given in per unity [pu].

Document U.S. Pat. No. 7,629,705B2 provides a method including configuring a generator such that it remains electrically connected to the grid during and subsequent to a voltage amplitude of the electric power decreasing to approximately zero volts for a predetermined period of time, thereby facilitating zero voltage ride through (ZVRT).

SUMMARY OF THE INVENTION

Prior art solutions do not state how requirements set by the operator at a point of interconnection to the grid of the wind farm electric system are managed by the control system of the wind turbine which generally handles local measurements made at the wind turbine terminals.

This invention provides a solution to optimally manage those requirements ensuring on the one hand, that the requirements set by the grid operators are appropriately and accurately accomplished at a point of interconnection (POI) and on the other hand, preventing the wind turbines from over fulfilling the requirements, for example, by remaining connected at voltages levels higher or lower than the ones required which, although possible, may cause higher loads and currents in the wind turbines than needed to fulfill the requirements. This solution avoids those drawbacks, as the wind turbines no longer use values specified for another point of the electrical power system (like the point of interconnection (POI)) but values appropriate for their own point of connection to the electrical power system. For example, during a voltage tip, the voltage level at wind turbine terminals may be higher than the voltage level at the point of interconnection (POI). Nevertheless, if a voltage dip profile requirement set for the point of interconnection (POI) is used in the wind turbine control software, the wind turbine will remain connected at voltage levels lower than the ones needed to fulfill the grid code requirements and will cause the wind turbine to be exposed to higher currents and loads.

DETAILED DESCRIPTION OF THE INVENTION

Figure 1:
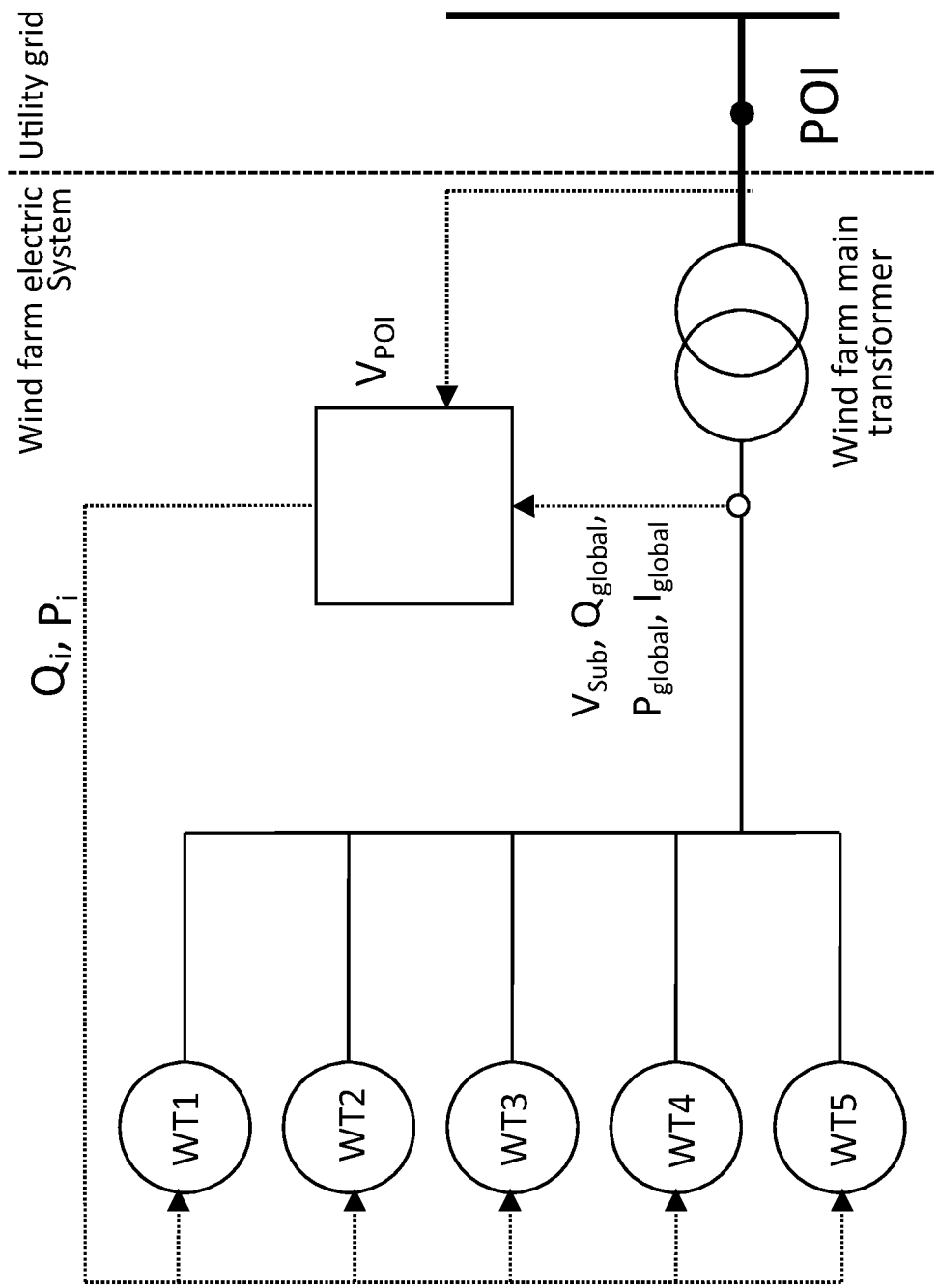
FIG. 1 shows a single line diagram of a wind farm consisting of 5 wind turbines connected to an electric power system for which the method for operating an electric machine of the present invention is carried out, being the electric machine a wind turbine.

As schematically shown in FIG. 1, wind turbines are generally connected to an electric power system that comprises at least a wind farm electric system and an external electric grid (utility grid) to which other generators and loads are connected. The electric power system may further comprise a wind farm main transformer at a point of interconnection (POI) of the wind farm electric system to the external electric grid to adapt the voltage level of the wind farm electric system to the voltage level of the external electric grid.

Figure 2:
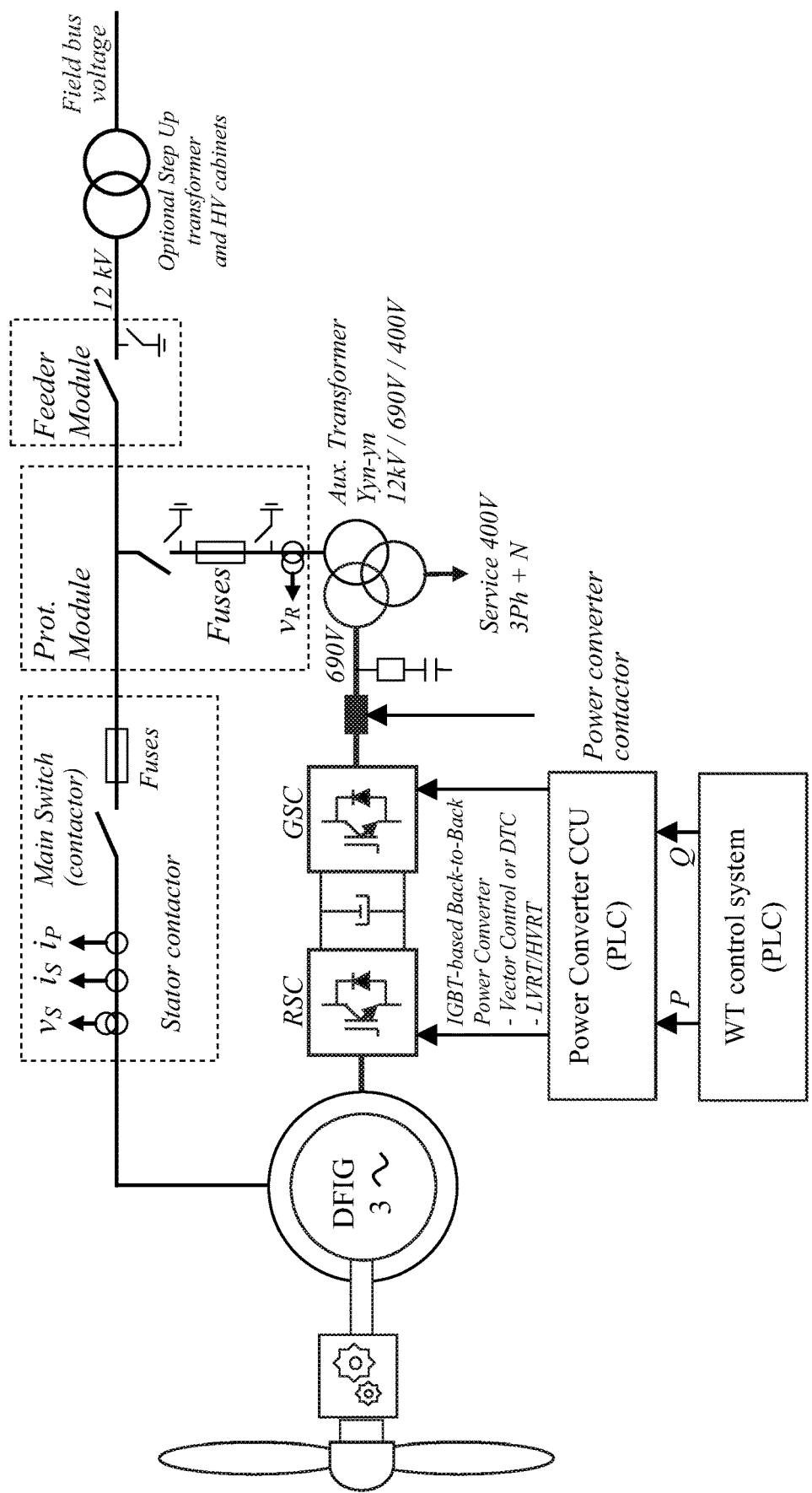
FIG. 2 shows a first embodiment of a simplified electrical power circuit of a wind turbine according to the invention, for which the method for operating an electric machine of the present invention is carried out.
Figure 3:
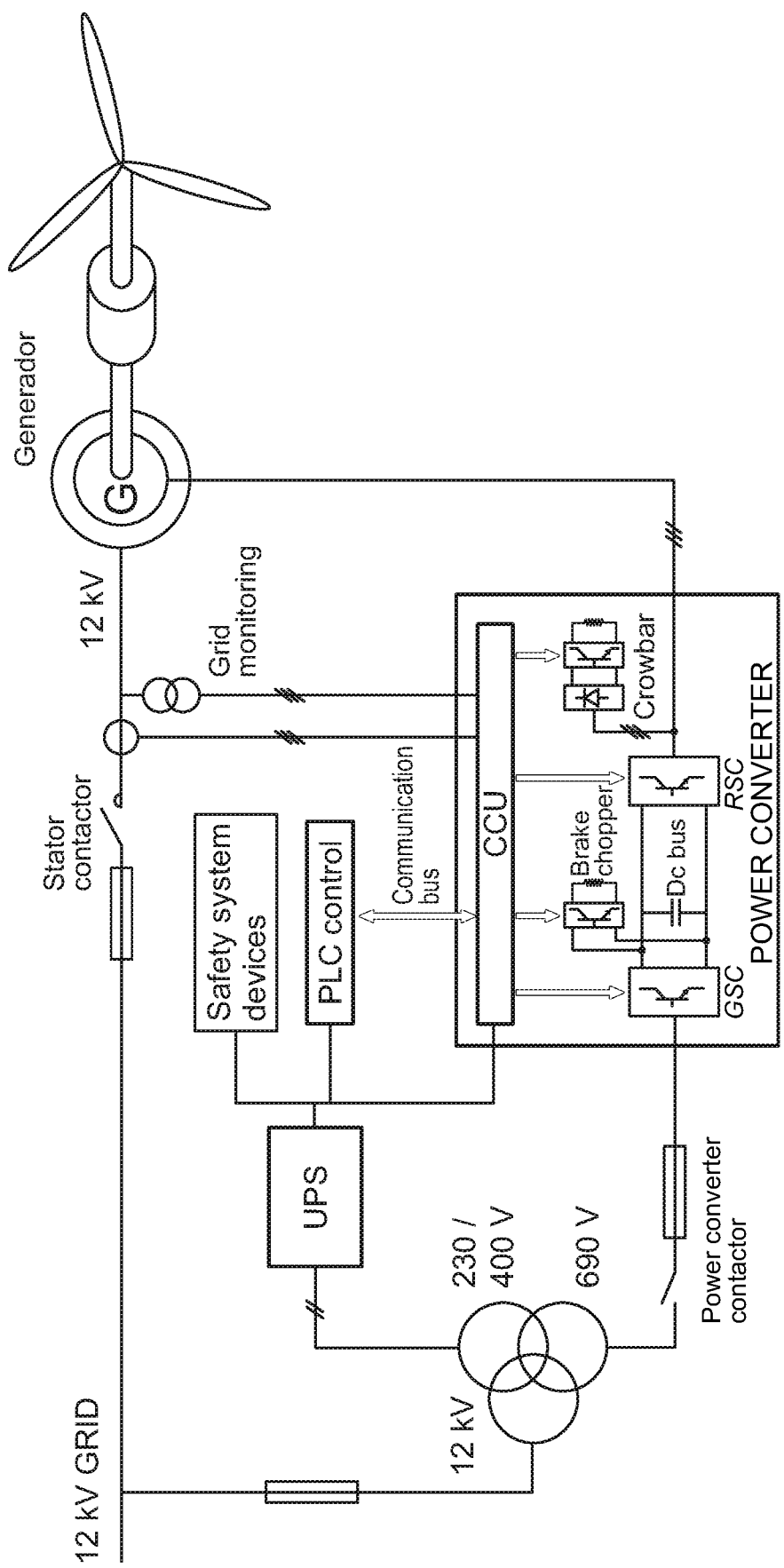
FIG. 3 shows a second embodiment of a simplified electrical power circuit of a wind turbine according to the invention, for which the method for operating an electric machine of the present invention is carried out.

FIGS. 2 and 3 show simplified electrical power circuits of a wind turbine according to the invention. The wind turbine comprises an electrical machine, comprising in particular a doubly fed induction generator (DFIG), that is electronically controlled by a power converter which connects the rotor to the electric power system. The power converter comprises a rotor side converter (RSC) and a grid side converter (GSC) connected through a DC link. In the embodiment, the rated stator line voltage is 12 kV. Active power (P) and reactive power (Q) generated by the DFIG are controlled through the rotor currents that are in turn controlled by means of a power converter based on IGBTs. In a particular embodiment, power converter supply is 690V while auxiliary services require 400V, thus requiring a step-down transformer 12 kV/690V/400V.

In an embodiment, the wind turbine comprises a control system (wind turbine control system, referred as PLC control in FIG. 3) that is configured to send among others power set points to a power converter controller (CCU) through a communication bus which hereinafter controls currents in order to comply with the received set points.

In an embodiment, the wind turbine comprises two main controllable contactors, i.e. the stator contactor and the power converter contactor, which can be operated in a controlled manner to at least partially disconnect the wind turbine from the electric power system. In particular, the contactors can be controlled depending on a series of wind turbine variables such as for example mechanical variables (including rotor speed, acceleration or vibration measurements) or electrical variables (current or voltage measurements).

Grid monitoring devices such as current and voltage sensors are connected to the wind turbine terminals, at least to the stator terminals and/or to the power converter terminals at the high voltage side of the auxiliary transformer, to obtain some voltage and current measurements (Vs, Vr, is, ip) that will be used for controlling the wind turbine, specifically the power converter and the controllable contactors.

For field bus voltages higher than 12 kV, the wind turbine may comprise also a set consisting of an optional step up transformer and high voltage cabinets (operation and protection) that can be placed inside the wind turbine tower, as shown in FIG. 2.

According to the invention, the wind turbine includes some specific devices in order to remain connected during voltage dips (undervoltages) and overvoltages in the electric power system (usually known as to be able to ride through voltage faults, or voltage dip ride through capability). These devices may include among others:
  an active crowbar connected to the rotor terminals and/or a brake chopper connected to the DC link of the power converter, to protect the power converter from excessive over currents;
  an uninterruptible Power Supply (UPS) to power the wind turbine control systems during the faults.

Those devices are generally designed to permit different configurations of the wind turbines to fulfil the requirements of local grid operators in any country: EON (Germany), NGC (England), FERC (EEUU), etc.

Adequate dimensioning of the abovementioned wind turbine devices may enable the wind turbines to ride through even 0%-voltage three-phase short-circuits longer than 150 ms at the point of interconnection of the WF electrical system to the grid.

Figure 4:
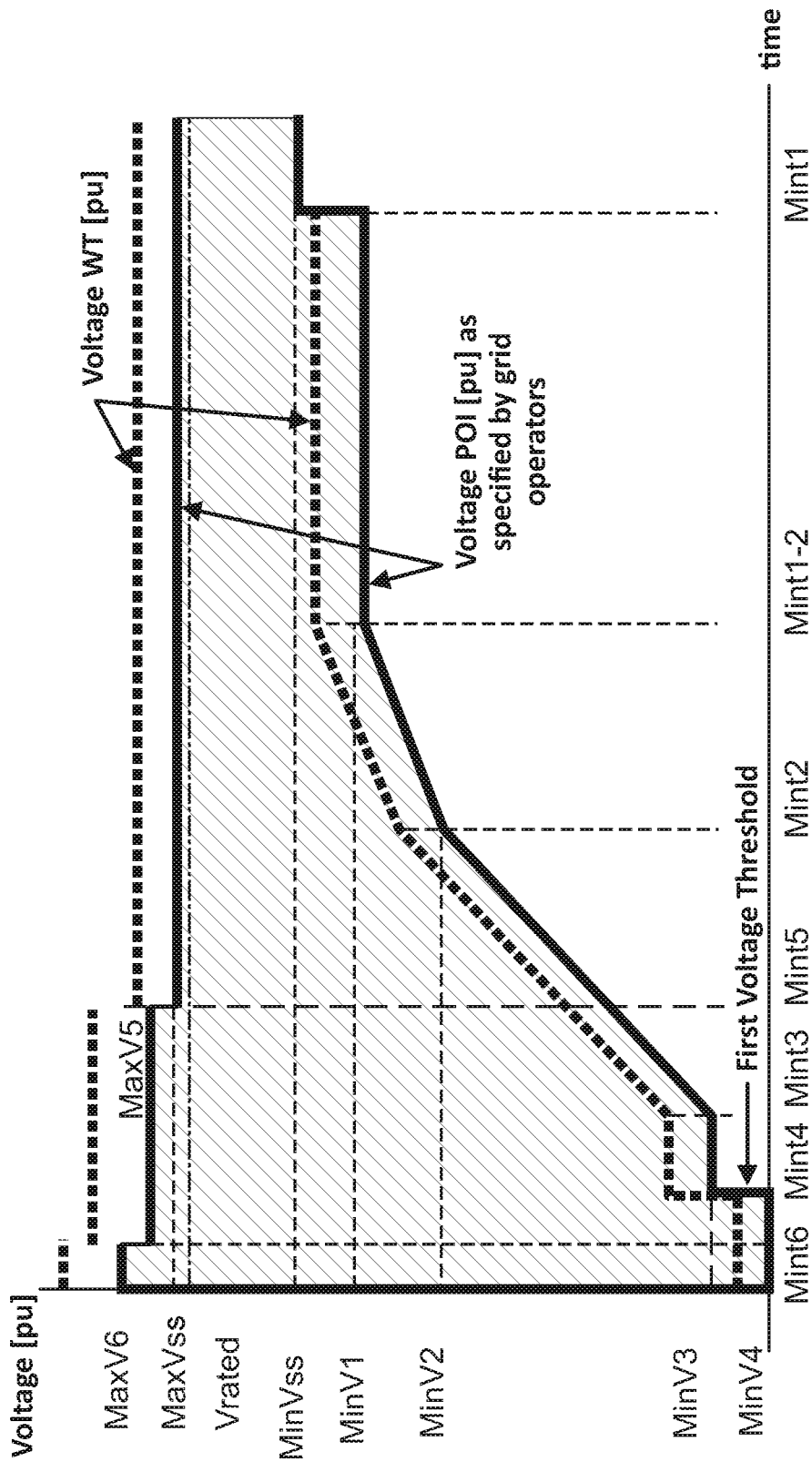
FIG. 4 shows an example of a voltage vs. time curve in which a wind turbine has to remain connected as could be specified by a grid operator according to the method for operating an electric machine of the present invention.

FIG. 4 depicts an exemplary voltage vs. time curve in which a wind turbine has to remain connected as could be specified by a grid operator. It typically includes a predetermined voltage range, so called steady state voltage range (generally including +/−10% of rated voltage) where the wind turbines are required to operate normally. Outside the steady state voltage range and above, over voltages are stood depending on their duration and level. For example, the wind turbine is configured to ride through overvoltages up to +15% for 1 second while overvoltages up to 20% of the rated voltage are admitted during 100 ms as a maximum.

Grey area in FIG. 4 (within the thick continuous lines) shows an example of a voltage at the point of interconnection (POI) vs. time region where the wind turbine is required to operate by the grid operators. Outside that region the wind turbine can stop. Steady state operation is limited between MaxVss and MinVss generally at 110% of Vrated and 90% of Vrated respectively. Beyond those limits but within the grey area the wind turbine must at least remain connected to the grid.

FIG. 4 further shows, represented by thick dotted lines, per unity voltage values at the terminals of a particular wind turbine (Voltage wind turbine [pu]) corresponding to the voltage at the point of interconnection (POI) limits set by the grid operator corresponding to the thick continuous lines (Voltage point of interconnection (POI) [pu]). This difference between the point of interconnection (POI) voltage values and the wind turbine voltage values is due to the current generated by the wind turbines in the wind farm and the impedance of the electrical components connected between the wind turbines and the point of interconnection (POI), mainly consisting of, but not limited to, power lines and transformers.

Figure 5:
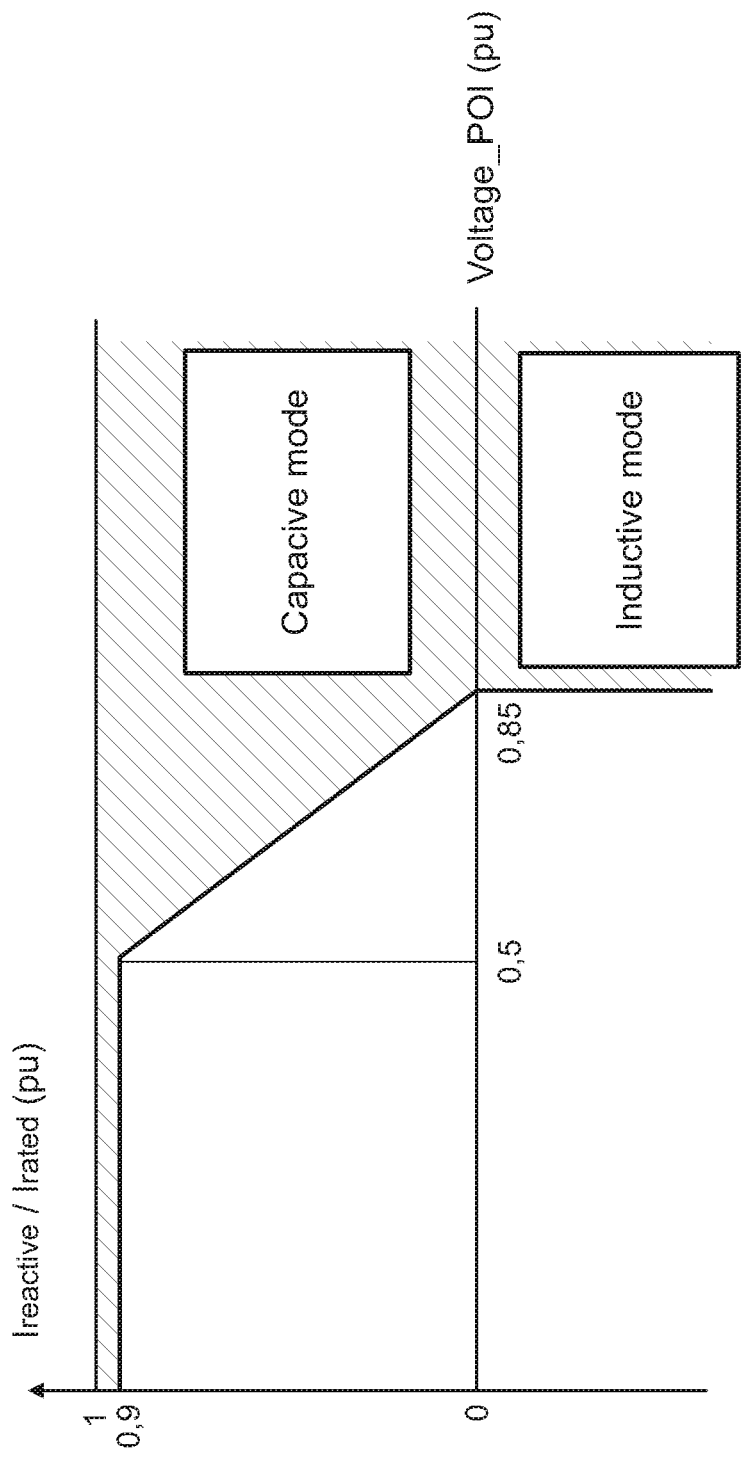
FIG. 5 shows an example of a reactive current injection requirement during a voltage dip according to the method for operating an electric machine of the present invention.

Additionally, grid operators commonly require a certain reactive power or reactive current injection depending on the voltage value during a voltage fault (either being an undervoltage or an overvoltage). FIG. 5 shows an example of the reactive current injection required according to the voltage level.

As it has been explained, the voltage level in pu at the point of interconnection (POI) differs from the voltage level in pu at the wind turbine terminals at a given time due to the existing impedance between the wind turbine terminals and the point of interconnection (POI).

According to a first embodiment of the invention a method for operating an electrical machine is provided, said method comprising:
  coupling the electrical machine to an electric power system comprising a point of interconnection (POI) to a utility grid; and
  configuring the electrical machine such that the electrical machine remains electrically connected to the electric power system during and subsequent to a voltage amplitude of the electric power system operating outside of a predetermined range for an undetermined period of time, and further configuring the control system such that it uses at least one algorithm to calculate an estimated voltage at the point of interconnection (POI) during the fault.

In particular, the electrical machine comprises a generator of a wind turbine forming part of a wind farm, the wind turbine being connected to an electric power system that comprises a wind farm electric system and an external electric system, namely a utility grid, where to other generators and loads are connected.

In an embodiment, the method further comprises configuring the control system so as to control the electrical machine during the fault according to the estimated voltage at the point of interconnection (POI).

Due to the short duration of the faults and the high speed of response required to the wind turbine to generate reactive power or reactive current, for example, it is not convenient to use real measurements made at the point of interconnection (POI) during the fault that need to be sent to the wind turbine control system to control the wind turbine behavior as, due to delays in communications and control routines, the response given by the wind turbine according to such point of interconnection (POI) voltage measurements may be inappropriate by the time the response is reached and according to the new situation.

For this reason, an algorithm to calculate an estimated voltage at the point of interconnection (POI) is used instead. Furthermore, the control system is configured to control the wind turbine during the fault according to the estimated voltage at the point of interconnection (POI) to provide a more accurate response: remaining connected until adequate voltage levels are reached at the point of interconnection (POI) and supplying reactive power or reactive current according to the voltage at the point of interconnection (POI).

Given the nature of the grid, voltage (in p.u) is higher at the wind turbine terminals than at the point of interconnection (POI). During a fault, for example, an overvoltage, this implies that voltage is even higher at the wind turbine terminals than at the point of interconnection (POI). If the voltage vs. time specified by the grid operator is directly used to configure the wind turbine disconnection, the wind turbine will be disconnected at a voltage level lower than the adequate one. Rather, according to the invention, the algorithm will provide an estimation of the voltage at the point of interconnection (POI) terminals that will be compared to the overvoltage vs. time curve required by the grid operator and if the estimation of the voltage at the point of interconnection (POI) terminals is higher than the predefined overvoltage vs. time curve, the wind turbine will be disconnected from the grid.

Figure 6:
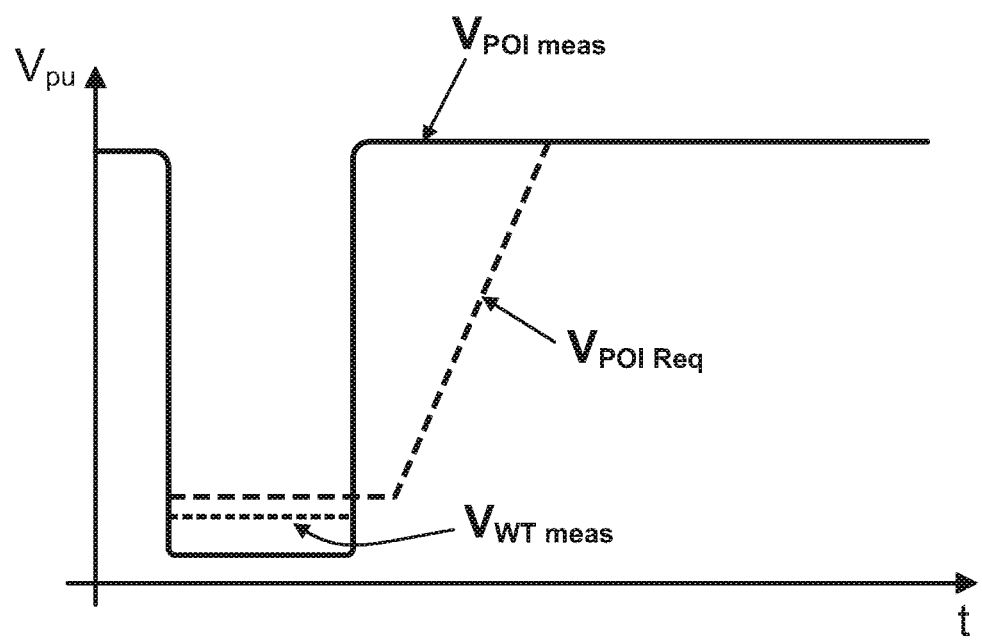
FIG. 6 shows voltage measurements at the point of interconnection (POI) and at the wind turbine terminals in an exemplary event compared to a voltage ride through curve requirement at the point of interconnection (POI) according to the method for operating an electric machine of the present invention.

The same applies to low voltage events. FIG. 6 shows voltage measurements at the point of interconnection (POI) ($V_{POI\_meas}$) and voltage measurements at the wind turbine terminals ($V_{WT\_meas}$) in an exemplary event compared to a voltage ride through curve requirement at the point of interconnection (POI) ($V_{POI\_Req}$). In this case (as shown in FIG. 6), as the measured voltage (in p.u) is higher at the wind turbine terminals ($V_{WT\_meas}$) than the measured voltage at the point of interconnection (POI) ($V_{POI\_meas}$), according to a state of the art configuration of a wind turbine control system, the wind turbine control system will compare the voltage measurements made at the wind turbine terminals directly with the undervoltage vs. time curve required by the grid operator (that is set according to the point of interconnection (POI) level), and hence the wind turbine will remain connected at voltage levels lower than the ones required, this entailing higher loading and possible overheating of the wind turbine components.

In an embodiment, a reactive power or current set point is calculated according to the estimated voltage at the point of interconnection (POI) during the fault. As there is a small difference between the voltage level at the wind turbine terminals (voltage measurement used for controlling) and the voltage at the point of interconnection (POI), the response may be inaccurate if state of the art control methods are used.

The method further comprises measuring the reactive power generated or calculating the reactive current required and configuring the at least one algorithm to use the reactive power generated and the voltage measured at the wind turbine terminals to calculate the voltage at the point of interconnection (POI).

The algorithm may further be configured such as to use an impedance value corresponding to the equivalent impedance existing between the wind turbine terminals and the point of interconnection (POI).

In an embodiment, the impedance value may be estimated by the algorithm, for example, based on:
  voltage measurements made at the point of interconnection (POI) and sent by a central wind farm controller to the control system,
  voltage measurements made at the wind turbine terminals and current measurements made at the wind turbine terminals
all previous measurements made at different points of time prior to the fault.

Alternatively, the impedance value may be predetermined according to simulation results and theoretic studies done prior to configuring the control system.

The control method may be applied to any kind of voltage fault, for example a voltage dip or an overvoltage.

The control method includes configuring the control system such as to partially disconnect the electrical machine when the estimated voltage at the point of interconnection (POI) decreases below a first voltage threshold.

The invention claimed is:

1. A method for operating an electrical machine, said method comprising:
  coupling the electrical machine to an electric power system comprising a point of interconnection (POI) to a utility grid;
  configuring the electrical machine such that the electrical machine remains electrically connected to the electric power system during and subsequent to a voltage amplitude of the electric power system operating outside of a predetermined range for an undetermined period of time;
  configuring a control system such that it uses at least one algorithm to calculate an estimated voltage at the point of interconnection (POI) during a fault; and
  configuring the control system such as to partially disconnect the electrical machine based on the estimated voltage at the point of interconnection (POI) during a fault;
wherein a reactive power or current set point is calculated according to the estimated voltage at the point of interconnection (POI) during the fault; and
wherein the algorithm further uses an impedance value corresponding to an equivalent impedance existing between wind turbine terminals and the point of interconnection (POI).

2. The method of claim 1 wherein it further comprises configuring the control system so as to control the electrical machine during the fault according to the estimated voltage at the point of interconnection (POI), the electrical machine comprised by a wind turbine.

3. The method of claim 1 wherein the method further comprises measuring the reactive power generated or calculating the reactive current required and wherein the at least one algorithm uses the reactive power generated or the reactive current required and the voltage measured at wind turbine terminals to calculate the estimated voltage at the point of interconnection (POI).

4. The method of claim 1 wherein the impedance value is estimated based on:
  i. voltage measurements made at the point of interconnection (POI) and sent by a central wind farm controller to the control system, ii. voltage measurements made at the wind turbine terminals, and iii. current measurements made at the wind turbine terminals all previous measurements made at different points of time prior to the fault.

5. The method of claim 1 wherein the impedance value is predetermined.

6. The method of claim 1 wherein the fault is a voltage dip.

7. The method of claim 1 wherein the fault is an overvoltage.

8. The method of claim 6 wherein configuring the control system such as to partially disconnect the electrical machine based on the estimated voltage at the point of interconnection (POI) during a fault is carried out when the estimated voltage at the point of interconnection (POI) decreases below a first voltage threshold.

9. The method of claim 7 wherein configuring the control system such as to partially disconnect the electrical machine based on the estimated voltage at the point of interconnection (POI) during a fault is carried out when the estimated voltage at the point of interconnection (POI) increases above a second voltage threshold.

10. The method of claim 7 wherein configuring the control system such as to partially disconnect the electrical machine based on the estimated voltage at the point of interconnection (POI) during a fault is carried out when the estimated voltage at the point of interconnection (POI) is higher than the predefined overvoltage vs. time curve.

11. A wind turbine comprising:
an electrical machine coupled to an electric power system comprising a point of interconnection (POI) to a utility grid; and
a control system;
wherein the electrical machine is configured such that the electrical machine remains electrically connected to the electric power system during and subsequent to a voltage amplitude of the electric power system operating outside of a predetermined range for an undetermined period of time, and
wherein the control system is configured to use at least one algorithm to calculate an estimated voltage at the point of interconnection (POI) during a fault, and
wherein the control system is also configured to partially disconnect the electrical machine based on the estimated voltage at the point of interconnection (POI) during a fault;
wherein the control system is also configured to calculate a reactive power or current set point according to the estimated voltage at the point of interconnection (POI) during the fault; and
wherein the control system is also configured, by means of the at least one algorithm, to use an impedance value corresponding to an equivalent impedance existing between wind turbine terminals and the point of interconnection (POI).

12. The wind turbine of claim 11 wherein the fault is a voltage dip and wherein the control system is configured to partially disconnect the electrical machine based on the estimated voltage at the point of interconnection (POI) during a fault when the estimated voltage at the point of interconnection (POI) decreases below a first voltage threshold.

13. The wind turbine of claim 11 wherein the fault is an overvoltage and wherein the control system is configured to partially disconnect the electrical machine based on the estimated voltage at the point of interconnection (POI) during a fault when the estimated voltage at the point of interconnection (POI) increases above a second voltage threshold.

14. The wind turbine of claim 11 wherein the fault is an overvoltage and wherein the control system is configured to partially disconnect the electrical machine based on the estimated voltage at the point of interconnection (POI) during a fault when the estimated voltage at the point of interconnection (POI) is higher than the predefined overvoltage vs. time curve.

15. The wind turbine of claim 11 wherein the control system is also configured to measure the reactive power generated or to calculate the reactive current required and to use the at least one algorithm to calculate the estimated voltage at the point of interconnection (POI) by means of the reactive power generated or the reactive current required and the voltage measured at wind turbine terminals.

16. The wind turbine of claim 11 wherein the impedance value is estimated based on:

i. voltage measurements made at the point of interconnection (POI) and sent by a central wind farm controller to the control system, ii. voltage measurements made at the wind turbine terminals, and iii. current measurements made at the wind turbine terminals all previous measurements made at different points of time prior to the fault.

* * * * *